US010549755B2

(12) United States Patent
Meinhard et al.

(10) Patent No.: US 10,549,755 B2
(45) Date of Patent: Feb. 4, 2020

(54) START-STOP DEVICE FOR INITIATING AN AUTOMATIC SWITCH-OFF PROCESS OF A DRIVING MACHINE

(71) Applicant: Bayerische Motoren Werke Aktiengesellschaft, Munich (DE)

(72) Inventors: Tobias Meinhard, Munich (DE); Frank Bodendorf, Kaufering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/124,752

(22) Filed: Sep. 7, 2018

(65) Prior Publication Data
US 2019/0001982 A1 Jan. 3, 2019

Related U.S. Application Data

(63) Continuation of application No. PCT/EP2017/055308, filed on Mar. 7, 2017.

(30) Foreign Application Priority Data

Mar. 9, 2016 (DE) ........................ 10 2016 203 845

(51) Int. Cl.
*B60W 30/18* (2012.01)
*F02D 41/04* (2006.01)
(Continued)

(52) U.S. Cl.
CPC ..... *B60W 30/18018* (2013.01); *F02D 41/042* (2013.01); *F02N 11/0833* (2013.01);
(Continued)

(58) Field of Classification Search
CPC ......... B60W 30/1808; B60W 30/18018; F02D 41/042; F02N 11/0833; F02N 11/0844;
(Continued)

(56) References Cited

U.S. PATENT DOCUMENTS 6,195,985 B1 3/2001 del Re et al.
2004/0149247 A1* 8/2004 Kataoka ................ F02N 11/006
123/179.4
(Continued)

FOREIGN PATENT DOCUMENTS

DE 100 23 331 A1 6/2001
DE 10 2007 009 833 A1 9/2008
(Continued)

OTHER PUBLICATIONS

International Search Report (PCT/ISA/210) issued in PCT Application No. PCT/EP2017/055308 dated May 19, 2017 with English translation (seven pages).
(Continued)

*Primary Examiner* — Mahmoud Gimie
(74) *Attorney, Agent, or Firm* — Crowell & Moring LLP

(57) ABSTRACT

A start-stop device initiates an automatic switch-off process of a driving machine in a motor vehicle. The start-stop device is designed to automatically switch off the driving machine when predefined switch-off conditions are met. The start-stop device has a stop coordinator which identifies a switch-off behavior suitable for the switch-off process on the basis of available information and ensures that the identified switch-off behavior is implemented when an automatic switch-off process is initiated.

17 Claims, 3 Drawing Sheets

(51) Int. Cl.
*F02N 11/08* (2006.01)
*F02N 19/00* (2010.01)

(52) U.S. Cl.
CPC .... *F02N 11/0844* (2013.01); *F02N 2019/008* (2013.01); *F02N 2200/0801* (2013.01); *F02N 2200/0802* (2013.01); *F02N 2300/2002* (2013.01)

(58) Field of Classification Search
CPC ....... F02N 2019/088; F02N 2200/0801; F02N 2200/0802; F02N 2300/2002
USPC ...................................................... 123/179.4
See application file for complete search history.

(56) References Cited

U.S. PATENT DOCUMENTS

| | | | |
|---|---|---|---|
| 2010/0228460 A1 | 9/2010 | Saito | |
| 2012/0204827 A1 | 8/2012 | Sieber et al. | |
| 2013/0124057 A1* | 5/2013 | Lenz | F16H 59/36 |
| | | | 701/67 |
| 2014/0039744 A1* | 2/2014 | Morisaki | B60K 6/445 |
| | | | 701/22 |
| 2014/0309910 A1* | 10/2014 | Hesketh | F02N 11/0822 |
| | | | 701/112 |
| 2015/0019109 A1 | 1/2015 | Trofimov et al. | |

FOREIGN PATENT DOCUMENTS

| | | |
|---|---|---|
| DE | 10 2010 000 615 A1 | 9/2010 |
| DE | 10 2009 045 686 A1 | 4/2011 |
| DE | 10 2011 004 052 A1 | 10/2011 |
| DE | 10 2012 105 307 A1 | 12/2013 |
| DE | 10 2014 206 509 A1 | 10/2014 |
| DE | 10 2014 226 004 A1 | 6/2016 |
| EP | 0 913 564 A1 | 5/1999 |
| FR | 2 937 091 A1 | 4/2010 |
| GB | 2521428 A | 6/2015 |
| WO | WO 2004/018246 A1 | 3/2004 |

OTHER PUBLICATIONS

German-language Written Opinion (PCT/ISA/237) issued in PCT Application No. PCT/EP2017/055308 dated May 19, 2017 (six pages).

German-language Search report issued in counterpart German Application No. 10 2016 203 845.1 dated Nov. 21, 2016 with partial English translation (10 pages).

* cited by examiner

| Meaning | Focus |
|---|---|
| Stop using traction | Shut-down position |
| Stop without traction when the vehicle is rolling | Reflex start time |
| Stop without traction when the vehicle is stationary | Stopping comfort |

Fig. 3

START-STOP DEVICE FOR INITIATING AN AUTOMATIC SWITCH-OFF PROCESS OF A DRIVING MACHINE

CROSS REFERENCE TO RELATED APPLICATIONS

This application is a continuation of PCT International Application No. PCT/EP2017/055308, filed Mar. 7, 2017, which claims priority under 35 U.S.C. § 119 from German Patent Application No. 10 2016 203 845.1, filed Mar. 9, 2016, the entire disclosures of which are herein expressly incorporated by reference.

BACKGROUND AND SUMMARY OF THE INVENTION

The invention relates to a start-stop device for initiating an automatic switch-off procedure of a drive machine in a motor vehicle.

At present, internal combustion engines are usually switched off manually by the driver by means of an ignition key or by means of actuating an operating element. One exception is a method that is proposed in DE 100 23 331 A1. In said method, the brake pedal position or the brake pedal pressure is evaluated in lieu of the ignition key. The switch-off procedure of the internal combustion engine is initiated if, after the motor vehicle is brought to a standstill, the brake pedal is actuated more intensely in its already actuated position. In order to drive on, the brake pedal is released and the gas pedal is pressed as a result of which a procedure of starting the internal combustion engine is initiated. The disadvantage with methods of this type is that the driver of the motor vehicle is solely responsible for switching off the internal combustion engine. Analyses of modern driving behavior indicates that despite increased environmental awareness and increased fuel prices, a manual switch-off procedure of the internal combustion engine, for example at traffic lights, is seldom performed independently.

In order to reduce fuel consumption and pollutant emissions, vehicles are already provided with systems that automatically switch off the internal combustion engine of a motor vehicle in specific circumstances or if predetermined switch-off conditions are present and said systems automatically switch said internal combustion engine back on if predetermined switch-on conditions are present. Methods and systems or start-stop devices of this type are suitable above all for urban traffic for reducing the consumption of fuel since in urban traffic the vehicle often comes to a standstill at traffic lights or on account of the traffic and the operation of the internal combustion engine is not required.

At present, various switch-off and switch-on algorithms having different advantages are used by individual vehicle manufacturers. Vehicles having automatic transmissions are thus on the market in which the engine is automatically switched off if the driver has braked the vehicle to a standstill. The engine is restarted as soon as the brake pedal is released. Another switch-off algorithm in the case of automatic vehicles provides that the engine is only switched off after approximately 1 second after the vehicle has been brought to a standstill.

Furthermore, DE 10 2010 000 615 A1 discloses an automatic switch-off algorithm for automatic vehicles, wherein the engine is switched off if it drops below a predetermined speed (for example 20 km/h). If during the further progression of time, in other words while the engine is off, a zero speed is measured (actual speed may not be the same on account of sensor inaccuracies), a brake controlling procedure is built up by successively increasing the braking force so as to maintain the vehicle at a standstill.

Finally, DE 10 2014 206 509 A1 discloses a start-stop system for a motor vehicle, wherein the engine may be operated in two different stop-start operating modes having different switch-off conditions in which the engine is stopped if the respective stop conditions are fulfilled. The stop-start operating mode that is to be used is selected by means of a user input device that is to be actuated by the driver, in other words the driver selects which start-stop operating mode is applicable and is to be implemented.

It follows from this that the object of the invention is to provide a start-stop device that renders possible an improved adjustment of the switch-off procedure to the current situation.

This object is achieved in accordance with the invention by a start-stop device for initiating an automatic switch-off procedure of a drive machine in a motor vehicle, said start-stop device being configured so as to automatically switch off the drive machine if predetermined switch-off conditions are fulfilled, characterized in that the start-stop device comprises a stop coordinator that, based upon the prevailing information, identifies a switch-off behavior that is suitable for the switch-off procedure and, when initiating an automatic switch-off procedure, ensures that the identified switch-off behavior is achieved.

The invention is based on a fundamentally known start-stop device for initiating an automatic switch-off procedure of a drive machine in a motor vehicle, said start-stop device being configured so as to automatically switch off the drive machine if predetermined switch-off conditions are fulfilled. In particular, the automatic switch-off procedure of the drive machine may be initiated in the prevailing switch-off conditions either while the vehicle is (still) in motion (for example at low speeds) or while the vehicle is already at a standstill or almost at a standstill.

The invention is furthermore based on the knowledge that with regard to the shut-down behavior during known shut-down procedures a conflict of objectives may occur between shut-down comfort with shut-down time, ability to restart and engine shut-down position since, depending upon various constraints, a different shut-down behavior may be advantageous. The object of the invention is consequently to provide a system that independently solves this conflict of objectives.

In taking into account the above consideration, the invention provides a start-stop device for initiating an automatic switch-off procedure of a drive machine in a motor vehicle having an automatic transmission, an automated transmission or a manual transmission, wherein the start-stop device comprises a stop coordinator that, based upon the prevailing information, identifies a switch-off behavior that is suitable for the switch-off procedure and, when initiating an automatic switch-off procedure, ensures that the identified switch-off behavior is achieved.

In particular, the stop coordinator may be configured for this purpose so as to select a suitable stop operating mode that is to be initiated from at least two stop operating modes having respectively defined different switch-off behaviors depending upon prevailing information or operating parameters of the motor vehicle and, corresponding to the selected stop operating mode, to trigger an automatic switch-off procedure of the drive machine in order to achieve the associated switch-off behavior. The different stop operating modes may be configured in such a manner that they are fundamentally based on the same switch-off conditions but differ in the switch-off behavior or that these stop operating modes differ both in the case of the necessary switch-off conditions as well as in the switch-off behavior.

In a further advantageous embodiment of the invention, it is provided that there is no operating element by which the driver may himself in advance set or select a suitable switch-off behavior or a stop operating mode having defined shut-down behavior, in other words the selection is always performed by means of the stop coordinator. On account of the conflict of objectives during the shut-down behavior between more than two possibilities for one shut-down behavior, it may be provided that the stop coordinator is configured, depending upon the prevailing information, in particular the prevailing operating parameters of the vehicle, to select a stop operating mode that is to be initiated from at least three possible stop operating modes having different shut-down behaviors and, corresponding to the selected stop operating mode, to trigger an automatic switch-off procedure of the drive machine in order to achieve the associated switch-off behavior.

In tests, this has shown that at least one shut-down behavior that is to be identified, in particular the different shut-down behaviors of the possible stop operating modes, may be characterized as follows:

(1) Comfort-oriented shut-down behavior in which the drive machine is switched off as comfortably as possible or as quietly as possible. The focus is not to switch off the drive machine rapidly but rather to switch off the drive machine as comfortably as possible.

(2) Reflex start time-oriented shut-down behavior in which it is possible to restart the drive machine during the deceleration phase of the drive machine without the use of a starter for as long as possible. This shut-down behavior is particularly suitable if a so-called change of mind case (driver would actually like to drive on) is to be expected or possibly occurs.

(3) Shut-down position-optimized shut-down behavior in which it is possible to restart the drive machine as rapidly as possible or in an optimal manner after successfully switching off the drive machine/when the drive machine is at a standstill.

Corresponding information must be provided to the stop coordinator so that the stop coordinator may decide which shut-down behavior or which stop operating mode having the corresponding shut-down behavior appears to be most suitable at the actual point in time and is to be triggered. The stop coordinator is advantageously configured, depending upon prevailing information that describes the prevailing driving situation of the motor vehicle, so as to identify a suitable switch-off behavior for the switch-off procedure, in particular to select a stop operating mode that is to be initiated from the possible stop operating modes having different shut-down behaviors. The information that describes the prevailing driving situation may be prevailing operating parameters of the motor vehicle and/or prevailing information regarding the surrounding area (other road users, traffic management, road class, weather, time of day) and/or prevailing information regarding the driver (behavior, attention).

In a particularly advantageous embodiment of the invention, the stop coordinator is accordingly configured, depending upon prevailing information that provides information regarding the speed (rolling, at a standstill) and/or information regarding whether the transmission is operated with traction or without traction, so as to identify a switch-off behavior that is suitable for the switch-off procedure, in particular to select a stop operating mode that is to be initiated from the stop operating modes having different shut-down behaviors.

It is likewise possible, when making a decision regarding a suitable shut-down behavior, for information regarding energy consumers in the vehicle to be taken into account, in other words the stop coordinator may be configured so as to identify a switch-off behavior that is suitable for the automatic switch-off procedure taking into account at least information regarding auxiliary units or energy consumption of the vehicle, in particular regarding the prevailing or requested operating state and/or energy consumption of at least one auxiliary unit, in particular to select a stop operating mode that is to be initiated from the different stop operating modes having different shut-down behaviors.

In order to be able to achieve the identified shut-down behavior, the stop coordinator is advantageously configured to trigger or influence for the identified shut-down behavior, in particular according to the selected stop operating mode, a parameterization, which is predetermined for the selected stop operating mode, for at least one of the following actuating and/or closed-loop control functions or to influence their parameterization:

(1) Crankshaft shut-down position
(2) Function for influencing the ability to restart the drive machine while the drive machine is decelerating,
(3) Rotational speed reducing function,
(4) Air volume closed-loop control function,
(5) Auxiliary units actuating function, in particular function for actuating the generator and/or the air conditioning device of the motor vehicle, in particular the coupling of the air conditioning device, and/or
(6) Function for influencing the comfort-oriented shut-down behavior.

In a similar manner to the start-stop device that is proposed here in accordance with the invention, a corresponding method for initiating an automatic switch-off procedure of a drive machine may be embodied in a motor vehicle so as to switch off the drive machine automatically if predetermined switch-off conditions are fulfilled, wherein based upon the prevailing information a switch-off behavior that is suitable for the switch-off procedure is identified and when initiating an automatic switch-off procedure it is ensured that the identified switch-off behavior is achieved. Advantageously, depending upon prevailing operating parameters of the motor vehicle, a stop operating mode that is to be initiated may also be selected from at least two different stop operating modes having respectively defined (different) shut-down behavior and according to the selected stop operating mode a procedure of automatically switching off the drive machine is triggered in order to achieve the associated switch-off behavior.

Further advantageous embodiments of the start-stop device in accordance with the invention also apply for the method in accordance with the invention and said method may be implemented in a suitable control device, in particular in an engine control unit.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a table for illustrating a suitable shut-down behavior on account of prevailing operating conditions.

DETAILED DESCRIPTION OF THE DRAWINGS

Figure 1:
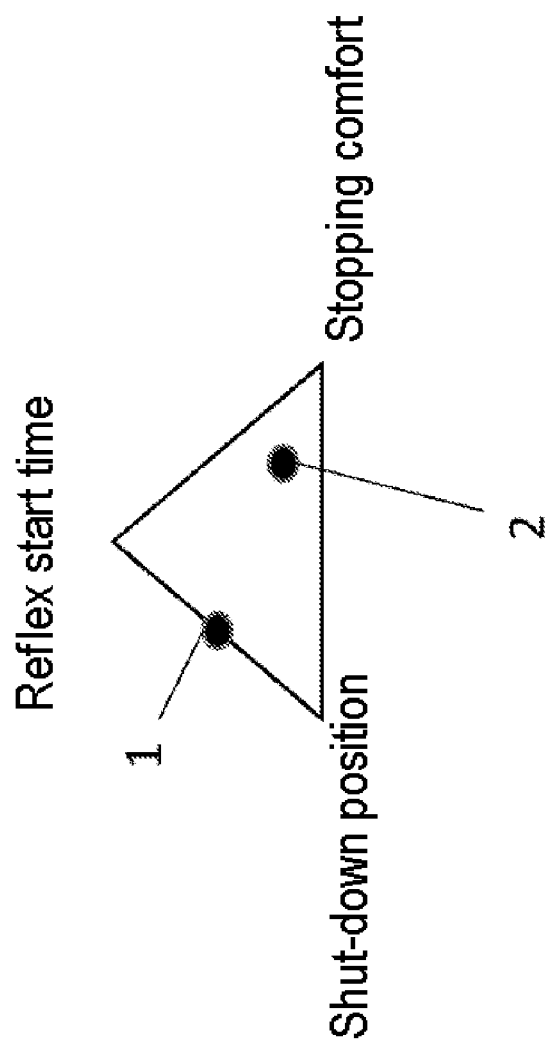
FIG. 1 illustrates a diagram for demonstrating the conflict of objectives with regard to the stop behavior in the case of a request for the automatic switch-off procedure of a drive machine in a motor vehicle.

FIG. 1 illustrates a diagram for demonstrating the conflict of objectives with regard to the stop behavior in the case of a request for the automatic switch-off procedure of a drive machine in a motor vehicle. It is assumed that three different shut-down behaviors may be achieved when initiating an automatic switch-off procedure.

The term "reflex start time" is understood to mean a reflex start time-oriented shut-down behavior in which it is to be possible to restart the drive machine during the deceleration phase of the drive machine without the use of a starter for as long as possible. This shut-down behavior is particularly suitable if a so-called change of mind case (driver would actually like to drive on) is to be expected or possibly occurs.

The term "shut-down position" is understood to mean a shut-down position-optimized shut-down behavior in which the drive machine is to be restarted as rapidly as possible or in an optimal manner after successfully switching off the drive machine (in other words after the drive machine has come to a standstill).

The term "stopping comfort" is understood to mean a comfort-oriented shut-down behavior in which the drive machine is to be switched off as comfortably as possible or as quietly as possible. The focus is not to switch off the drive machine rapidly but rather to switch off the drive machine as comfortably as possible.

With reference to FIG. 1, it is apparent that when implementing the shut-down behavior a conflict of objectives fundamentally occurs. By way of example, if a reflex start time-oriented shut-down behavior is to be achieved, it is thus not possible to simultaneously achieve a shut-down position-optimized shut-down behavior or comfort-oriented shut-down behavior. The same also applies when implementing another shut-down behavior.

However, in order to be able to achieve an at least optimized shut-down behavior for each driving situation, a decision regarding which shut-down behavior is at least generally speaking, to be taken is to be made in advance by way of an accordingly embodied start-stop coordinator. Where applicable a "mixed decision" is also possible.

The shut-down behavior that is referred to as 1 in FIG. 1 (mixture of shutdown position-optimized and reflex start time-oriented shut-down behavior) is to be achieved by way of example if the drive machine, in particular a drive machine that is embodied as an internal combustion engine, is to be automatically switched off when the vehicle is rolling since, when a vehicle is rolling, the stopping comfort plays a subordinate role since the vehicle is still moving anyway and the procedure of switching off the drive unit "is less important" when the vehicle is moving.

In contrast thereto, the shut-down behavior that is referred to as 2 (comfort-oriented shut-down behavior) is to be achieved by way of example if the drive machine is automatically switched off when the vehicle is at a standstill since a "smooth" switching off procedure appears to be fundamentally more important than a long reflex start time capability or than achieving an optimal shut-down position.

Figure 2:
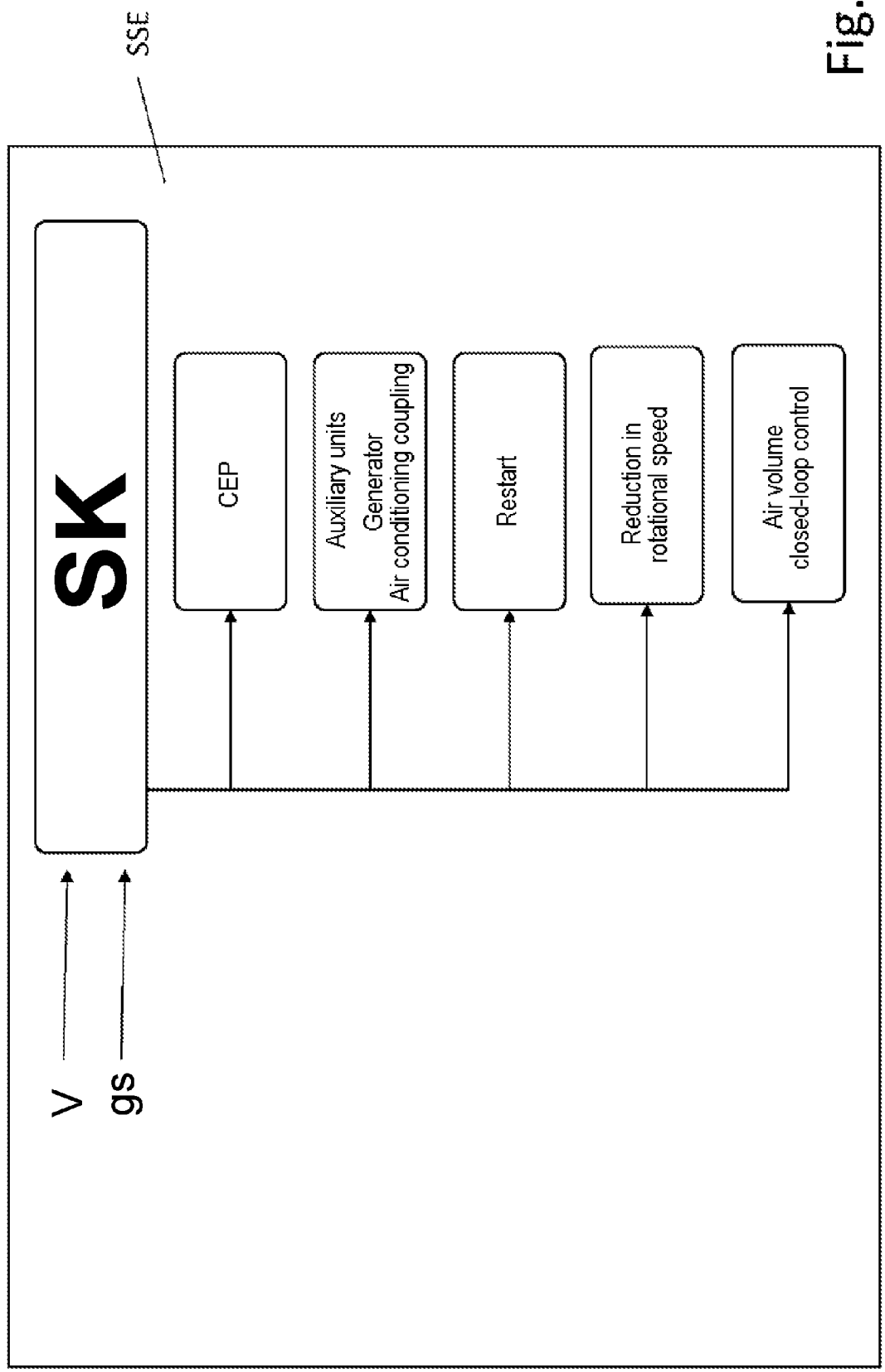
FIG. 2 illustrates one embodiment of a start-stop device in accordance with the invention with an illustration of the influence of a stop coordinator on various functions for achieving an identified suitable shut-down behavior.

FIG. 2 illustrates an embodiment of a start-stop device SSE in accordance with the invention, with an illustration of the influence of a stop coordinator SK on various functions for achieving an identified suitable shut-down behavior. The stop coordinator may be a processor-based device that is configured to execute program code to carry out its functions.

Fundamentally, the start-stop device SSE is embodied so as to trigger an automatic switch-off procedure of the drive machine in the presence of predetermined switch-off conditions if there is no relevant impediment to the switch-off procedure. In this example, an automatic switch-off procedure of the drive machine is to be possible even at low speeds (for example less than 25 km/h or less than 20 km/h or less than 5 km/h). However, if, when the vehicle is moving, not all the switch-off conditions are fulfilled or if an impediment to the switch-off procedure is present, an automatic switch-off procedure of the drive machine may thus also occur by way of example only when the vehicle is at a standstill or when the vehicle is close to being at a standstill, in particular if, in the case of vehicles having automatic transmissions, the brake pedal is actuated and on account of the brake pedal actuation a defined switch-off brake pressure threshold is exceeded. However, this possibility only represents one example. A plurality of other or different switching algorithms such as are known from the prior art are likewise also contemplated.

In order to be able to identify a suitable shut-down behavior, the stop coordinator SK receives at least one speed signal v as information regarding the prevailing speed of the vehicle, and also a transmission signal gs as information regarding whether there is currently traction or the vehicle is being operated without traction.

The stop coordinator takes into account these two signals v and gs when identifying a switch-off behavior that is suitable for a switch-off procedure that is to be initiated and ensures that at least generally speaking an accordingly identified switch-off behavior is achieved when initiating the automatic switch-off procedure. For this purpose, the start-stop coordinator influences at least one of the following vehicle functions:

(1) Crankshaft shut-down position,
(2) Actuating auxiliary units, in particular actuating the generator and/or the air conditioning coupling,
(3) Function for influencing the ability to restart the drive machine,
(4) Function for reducing the rotational speed, and/or
(5) Function for closed-loop controlling the volume of air.

In detail, the stop coordinator may also be embodied so as, taking into account the two input signals v and gs and further information that is relevant for the procedure of triggering an automatic switch-off procedure (for example brake pedal actuation, braking pressure that is applied, information regarding the surrounding area, indicator actuation, energy consumption of the auxiliary units, etc.), to initially fundamentally determine whether an automatic switch-off procedure of the drive machine would be possible on account of a stored switch-off algorithm. If one or multiple stop operating modes are possible, the stop coordinator SK identifies on the basis of the prevailing information the stop operating mode as the significant or relevant stop operating mode that is possible and by means of said stop operating mode on the basis of the prevailing information an optimal switch-off behavior—that is specifically defined or identified by means of the stop coordinator itself—is achieved.

In the case of the corresponding selection of the stop operating mode including the desired switch-off behavior, the stop coordinator SK triggers a suitable signal output according to the selection with the result that the predetermined or identified shut-down behavior is achieved.

Finally, FIG. 3 is a table for illustrating a suitable shut-down behavior on account of the prevailing operating conditions, said table being such as may be stored by way of example in the stop coordinator SK. Three different scenarios are illustrated:

1. Stopping with the vehicle at a standstill with transmission traction with a focus on engine shut-down position for an optimal, reproducible restart of the internal combustion engine after stopping the engine.

2. Stopping in the rolling vehicle with traction-free transmission, focus on reflex starts by means of clearly increased frequency of stopping the engine.

3. Stopping in the stationary vehicle with traction-free transmission with focus on stopping comfort.

On the basis of the invention that is disclosed here, it is possible depending upon the prevailing operating situation to achieve a shut-down behavior that is adjusted respectively to this situation. For example, a procedure of stopping the engine comfortably may be triggered by means of loading the auxiliary units and limited response behavior. In contrast, when a vehicle is rolling, a procedure of stopping the engine may be triggered with an optimal engine shut-down position and increased response.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for initiating an automatic switch-off procedure of a drive machine in a motor vehicle, comprising:
   a start-stop device configured to automatically switch-off the drive machine if predetermined switch-off conditions are fulfilled, wherein
   the start-stop device comprises a stop coordinator,
   the stop coordinator is configured to identify a switch-off behavior suitable for the switch-off procedure based on prevailing information, and
   the stop coordinator ensures that the identified switch-off behavior is implemented when the automatic switch-off procedure is initiated,
   at least one identifiable shut-down behavior of a possible stop operating mode is characterized as follows:
   (i) a comfort-oriented shut-down behavior in which the drive machine is switched off as comfortably as possible,
   (ii) a reflex start time-oriented shut-down behavior in which it is possible to restart the drive machine during the deceleration phase of the drive machine without the use of a starter for as long as possible,
   (iii) a shut-down position-optimized shut-down behavior in which it is possible to restart the drive machine as rapidly as possible after successfully switching off the drive machine.

2. The apparatus as claimed in claim 1, wherein
   the stop coordinator is configured so as to select a stop operating mode that is to be initiated from at least two stop operating modes having respectively defined switch-off behavior depending upon prevailing operating parameters of the motor vehicle and, corresponding to the selected stop operating mode, to trigger an automatic switch-off procedure of the drive machine in order to achieve the associated switch-off behavior.

3. The apparatus as claimed in claim 1, wherein
   the start-stop device has no operating element by which a driver may select a suitable switch-off behavior.

4. The apparatus as claimed in claim 1, wherein
   the stop coordinator is configured, depending upon prevailing operating parameters of the motor vehicle, to select a stop operating mode that is to be initiated from at least three possible stop operating modes having different shut-down behaviors and, corresponding to the selected stop operating mode, to trigger an automatic switch-off procedure of the drive machine in order to achieve the associated switch-off behavior.

5. The apparatus as claimed in claim 1, wherein
   the stop coordinator is configured so as, depending upon prevailing information that describes a prevailing driving situation, to identify a suitable switch-off behavior for the switch-off procedure.

6. The apparatus as claimed in claim 5, wherein
   the stop coordinator identifies the suitable switch-off behavior by selecting a stop operating mode that is to be initiated from the stop operating modes having different shut-down behaviors.

7. The apparatus as claimed in claim 1, wherein
   the stop coordinator is configured, depending upon prevailing information that provides information regarding the speed and/or information regarding whether a transmission is operated with traction or without traction, so as to identify a switch-off behavior that is suitable for the switch-off procedure.

8. The apparatus as claimed in claim 7, wherein
   the stop coordinator identifies the suitable switch-off behavior by selecting a stop operating mode that is to be initiated from the stop operating modes having different shut-down behaviors.

9. The apparatus as claimed in claim 1, wherein
   the stop coordinator is configured so as to identify a switch-off behavior that is suitable for the switch-off procedure taking into account information regarding an auxiliary unit.

10. The apparatus as claimed in claim 9, wherein
    the information regarding the auxiliary unit is information regarding a prevailing or requested operating state and/or energy consumption of the auxiliary unit.

11. The apparatus as claimed in claim 10, wherein
    the stop coordinator is configured to identify the switch-off behavior in order to select a stop operating mode that is to be initiated from the different stop operating modes having different shut-down behaviors.

12. An apparatus for initiating an automatic switch-off procedure of a drive machine in a motor vehicle, comprising:
    a start-stop device configured to automatically switch-off the drive machine if predetermined switch-off conditions are fulfilled, wherein
    the start-stop device comprises a stop coordinator,
    the stop coordinator is configured to identify a switch-off behavior suitable for the switch-off procedure based on prevailing information, and
    the stop coordinator ensures that the identified switch-off behavior is implemented when the automatic switch-off procedure is initiated, wherein
    the stop coordinator is configured, according to the identified suitable shut-down behavior, to trigger or influence for the identified shut-down behavior according to the selected stop operating mode, a parameterization, which is predetermined for the selected stop operating mode, for at least one of the following actuating and/or closed-loop control functions:

(i) crankshaft shut-down position,
(ii) function for influencing the ability to restart the drive machine while the drive machine is decelerating,
(iii) rotational speed reducing function,
(iv) air volume closed-loop control function,
(v) auxiliary units actuating function, in particular function for actuating the generator and/or the air conditioning device of the motor vehicle, and/or
(vi) function for influencing the comfort-oriented shut-down behavior.

13. A method of operating a start-stop device that initiates an automatic switch-off procedure of a drive machine in a motor vehicle, the method comprising the acts of:

identifying, by a stop coordinator of the start-stop device, a switch-off behavior that is suitable for the switch-off procedure based upon prevailing information; and ensuring, by the stop coordinator, that the identified switch-off behavior is implemented when an automatic switch-off procedure is initiated, wherein at least one identifiable shut-down behavior of a possible stop operating mode is characterized as follows:

(i) a comfort-oriented shut-down behavior in which the drive machine is switched off as comfortably as possible,
(ii) a reflex start time-oriented shut-down behavior in which it is possible to restart the drive machine during the deceleration phase of the drive machine without the use of a starter for as long as possible,
(iii) a shut-down position-optimized shut-down behavior in which it is possible to restart the drive machine as rapidly as possible after successfully switching off the drive machine.

14. The method as claimed in claim 13, wherein
the stop coordinator is configured so as to select a stop operating mode that is to be initiated from at least two stop operating modes having respectively defined switch-off behavior depending upon prevailing operating parameters of the motor vehicle and, corresponding to the selected stop operating mode, to trigger an automatic switch-off procedure of the drive machine in order to achieve the associated switch-off behavior.

15. The method as claimed in claim 13, wherein
the stop coordinator is configured, depending upon prevailing operating parameters of the motor vehicle, to select a stop operating mode that is to be initiated from at least three possible stop operating modes having different shut-down behaviors and, corresponding to the selected stop operating mode, to trigger an automatic switch-off procedure of the drive machine in order to achieve the associated switch-off behavior.

16. The method as claimed in claim 13, wherein
the stop coordinator is configured so as, depending upon prevailing information that describes a prevailing driving situation, to identify a suitable switch-off behavior for the switch-off procedure.

17. The method as claimed in claim 16, wherein
the stop coordinator is configured so as, depending upon prevailing information that describes a prevailing driving situation, to identify a suitable switch-off behavior for the switch-off procedure.

\* \* \* \* \*